(12) United States Patent
Stoiber et al.

(10) Patent No.: US 8,512,029 B2
(45) Date of Patent: Aug. 20, 2013

(54) BLOW MOLD

(75) Inventors: Christian Stoiber, Michelsneukirchen (DE); Thomas Albrecht, Beilngries (DE)

(73) Assignee: Krones AG, Neutraubling (DE)

( * ) Notice: Subject to any disclaimer, the term of this patent is extended or adjusted under 35 U.S.C. 154(b) by 236 days.

(21) Appl. No.: 13/219,585

(22) Filed: Aug. 26, 2011

(65) Prior Publication Data

US 2012/0052147 A1  Mar. 1, 2012

(30) Foreign Application Priority Data

Aug. 31, 2010  (DE) .......................... 10 2010 040 004

(51) Int. Cl.
*B29C 49/56* (2006.01)
*B29C 33/02* (2006.01)

(52) U.S. Cl.
USPC .............................. 425/526; 249/78; 425/541

(58) Field of Classification Search
USPC .............................. 425/522, 526, 541; 249/78
See application file for complete search history.

(56) References Cited

U.S. PATENT DOCUMENTS

| 705,772 | A | * | 7/1902 | Messer .......................... 425/526 |
| 2,361,553 | A | * | 10/1944 | Luertzing ........................ 65/302 |
| 3,504,403 | A | * | 4/1970 | Brown et al. .................... 425/86 |
| 5,041,247 | A | * | 8/1991 | Kim ............................... 264/37.1 |
| 7,878,794 | B2 | | 2/2011 | Rousseau et al. |
| 2006/0219709 | A1 | * | 10/2006 | Kagan ........................... 219/661 |
| 2007/0031531 | A1 | * | 2/2007 | Zoppas et al. ................. 425/526 |
| 2007/0085240 | A1 | * | 4/2007 | Miyagi et al. .................. 264/327 |
| 2009/0232929 | A1 | * | 9/2009 | Blochmann et al. .......... 425/522 |
| 2010/0047375 | A1 | | 2/2010 | Rousseau et al. |
| 2010/0203187 | A1 | | 8/2010 | Schmid et al. |
| 2011/0000097 | A1 | | 1/2011 | Grunert et al. |
| 2011/0104324 | A1 | * | 5/2011 | Langlois ........................ 425/522 |
| 2012/0052146 | A1 | * | 3/2012 | Hollriegl et al. .............. 425/523 |

FOREIGN PATENT DOCUMENTS

| DE | 102009008632 A1 | 8/2010 |
| EP | 1980386 A1 | 10/2008 |
| EP | 2202047 A1 | 6/2010 |
| WO | WO-2009/156698 A2 | 12/2009 |

OTHER PUBLICATIONS

German Search Report DE102010040004.1, dated Jan. 19, 2011.

* cited by examiner

*Primary Examiner* — Robert B Davis
(74) *Attorney, Agent, or Firm* — Marshall, Gerstein & Borun LLP (57) ABSTRACT

A blow mold having at least two mold parts, mold support shells containing the mold parts, a mold support at least for supporting the mold support shells, motion drives for opening and closing the blow mold, and a locking means adjustable at least in the direction of the mold cavity axis relative to the mold support shells for locking the closed blow mold and for supporting the mold parts against forces from the blow molding process. The locking means has at least one locking sleeve with an at least conical inner wall manufactured using high-strength fiber material, which can be slid with the inner wall onto conical outer surface areas of the mold support shells and supports the mold parts across essentially the complete height of the mold cavity in a locking manner.

23 Claims, 5 Drawing Sheets

BLOW MOLD

CROSS-REFERENCE TO RELATED APPLICATION

The present application claims the benefit of priority of German Application No. 102010040004.1 filed Aug. 31, 2011. The entire text of the priority application is incorporated herein by reference in its entirety.

FIELD OF THE DISCLOSURE

The disclosure relates to a blow mold such as of the type used in forming containers.

BACKGROUND

In blow molding or stretch-blow molding, at least the mold parts (mold halves) forming the wall regions of the container are usually received in mold support shells. The mold support shells normally also fulfill the function of controlling the temperature of the blow mold. To this end, channels through which a temperature control medium (water, oil) flows can be formed in the mold support shells. A usually two-part mold support is provided for fixing the mold support shells, the mold support producing the retaining function for the mold support shells and primarily serving to withstand the forces during the blow molding process. Especially the task of withstanding forces requires an extraordinarily stable design of the bearing of the mold support parts, the bearing also serving to open and close the blow mold. Furthermore, locking elements are provided in most cases in the front region of the mold support parts which, just as the bearing in the rear region, withstand the forces from the blow molding process. The mold support parts also have to be designed to be very stable and thus to have large dimensions because superimposed tensile stresses and bending stresses must be received. In this embodiment, however, the blow mold can possibly nevertheless minimally deform under the forces. The consequence would be a visible parting seam at the manufactured container. To prevent the mold parts from opening minimally, a mold support shell can be floatingly held in its mold support part, and a separate compensation element can act upon it to compensate the total deformation and inflexibly keep the mold parts together.

In the blow mold known from US 2010/0047375 A1, the locking means comprises a sleeve guided at a support in a linearly shiftable manner, where a collar closed in the circumferential direction is mounted at the edge of the sleeve situated at the front, seen in the direction in which the sleeve is slid onto the mold support shells. The mold support shells containing the mold parts can be swiveled about an axis situated underneath the blow mold and being oriented approximately radially with respect to the blow rotor axis and comprise clamps in the form of bow segments at reinforced outer wall areas, or outer wall areas provided with reinforcing ribs, the clamps defining externally conical pressing surfaces onto which the collar is slid to lock the blow mold and to support the mold parts against forces from the blow molding process. The conical pressing surfaces are only present in areas of upper parts of the mold support shells limited in the direction of the mold cavity axis, so that the locking pressure generated by the collar only acts on the mold support shells in a very restricted area. As the locking pressure of the collar thus locally acts on the mold support shells, and in the circumferential direction also only within limits, the mold support shells are reinforced above and underneath the conical pressing surfaces. The motion drive of the locking means is cam-controlled. The sleeve surrounding the bottom parts of the mold support shells and supporting the collar contains motion links in which cams of the mold support shells move when the collar is being slid onto the conical mating surfaces. The cams control the closing and opening of the blow mold. The mold parts are mounted in the mold support shells so as to be replaceable. Inside the sleeve supporting the collar, a bottom mold with its driving mechanism is accommodated. Due to the required reinforcements of the mold support shells and the complex locking means, heavy masses have to be quickly moved during the open, closing, and locking processes, and very stable motion drives are required. As the locking pressure of the collar acts upon the two mold support shells only in locally restricted areas, there is a risk in that uncontrollable deformations arise at the mold parts under the forces resulting from the blow molding process, whereby the mold parting plane can undesirably show at least in some areas in the manufactured container.

EP 1 980 386 A illustrates an auxiliary locking mechanism in the upper region of the blow mold via metallic cone surfaces at the mold shells and a cone at the blow nozzle placed there. The mold shells are also locked in a conventional manner further at the bottom.

SUMMARY OF THE DISCLOSURE

One aspect of the disclosure is to improve a blow mold of this kind such that the mold parts are locked and supported during the blow molding process in a different manner, that a compact design of the blow mold can be achieved, that small masses can be quickly moved, that even great forces are completely withstood during the blow molding process, and that motion drives having small dimensions can be employed for the locking function.

Being of an extremely low weight and having compact dimensions, the at least one locking sleeve manufactured using high-strength fiber material produces an extreme tensile strength and builds up the locking pressure uniformly across the whole periphery of the mold support shells and essentially the complete height of the mold cavity. Compared to mold support and locking means known up to now, the locking sleeve requires very little assembly space, which desirably permits a very dense arrangement of several blow molding stations on a blow rotor of a blow molding machine. Due to the small mass of the locking sleeve, a motion drive having small dimensions and only moderate power can be used, furthermore saving assembly space and nevertheless ensuring quick cycle times. The at least one locking sleeve is manufactured in a way e.g. similar to vehicle body components in automobile racing and, due to the material-specific high strength, needs an only relatively small wall thickness.

Here, it should be pointed out that the blow mold can be designed such that the mold support shells can be symmetrically opened in the mold parting plane, or one mold support shell is stationary and the other one can be folded open or be linearly moved away from the mold parting plane. To ensure zero backlash, the locking sleeve at least has the conical inner wall. Here, the outer wall of the locking sleeve can be cylindrical or also conical, optionally conical such that the wall thickness at the large-diameter end of the locking sleeve is thicker than that at the small-diameter end. Furthermore, the locking sleeve could comprise inside and/or outside reinforcing peripheral structures, such as ribs. Timer longitudinal ribs or a network of ribs are conceivable to reinforce and/or to reduce the contact surface. The blow mold as a mold part can also comprise a separate adjustable bottom mold which is locked, when the blow mold is closed, with the other mold parts forming the wall regions of the container.

The high-strength fiber material used for the manufacture of the locking sleeve suitably comprises carbon fibers that are commercially available in a great variety of specifications and can be relatively easily processed. As an alternative or in addition, other high-strength fibers, such as aramid fibers or the like, can also be used. The high-strength fiber material can be processed in the form of wovens, for example in the form of prepregs with plastic preimpregnation. In the completed state of the locking sleeve, the high-strength fiber material is embedded in a plastic matrix which is very temperature-resistant. Manufacture can be accomplished under the influence of temperature and pressure. Advantageously, the locking sleeve is wound from continuous fibers.

In a suitable embodiment, more than only one locking sleeve is slid onto the mold support shells. For example, the several locking sleeves are slid on one after the other from one end of the mold support shells until they nearly abut with their ends or completely abut, or even partially overlap each other. As an alternative, one locking sleeve could be slid on from one end, and the other locking sleeve from the opposite end of the mold support shells which in this case have outer side areas conical in opposite directions. It is ensured in each case that via the clamping tension of the cooperating conical surface areas, the locking pressure is generated uniformly and at a high level and around the whole periphery of the mold support shells, and that it is inflexibly maintained.

In a particularly suitable embodiment, the locking sleeve has a double wall, one wall, preferably the inner wall, forming a compensation element and/or a temperature control element in the blow mold. The compensation element suppresses minimal deformations of the mold parts under forces from the blow molding process. The temperature control element contributes to the temperature control of the blow mold or the mold parts, respectively.

In another suitable embodiment, a pressure pad is provided in at least one external depression of at least one mold support shell, for example in the form of a bag of elastic or viscous material filled with a pressure fluid. As an alternative, a kind of pressure pad could be formed after the locking sleeve has been slid on such that a seal bordering the external depression is brought into sealing contact with the inner wall of the locking sleeve, and e.g. a compensation medium is introduced under pressure from outside.

Between the walls of the double-walled locking sleeve, a pressure chamber can be provided that is filled or can be filled with a compensation and/or a temperature control medium, such as compressed air, oil or water, preferably even a pressure pad of an elastic and/or flexible material if the pressure chamber is used as a compensation element. In a further suitable embodiment, the phenomenon of the negative thermal expansion coefficient of carbon fibers and their electrical conductivity is utilized to either generate a compensation effect by electric heating and/or to control the temperature of the blow mold. The compensation effect is, for example, generated if the locking sleeve has been already sufficiently tightly slid on before and generates a basic locking pressure to then additionally increase and maintain the locking pressure without having to apply great linear forces via the motion drive of the locking sleeve.

In a suitable embodiment, a stretching rod which can be moved linearly into and out of the mold cavity is functionally associated to the blow mold. The at least one locking sleeve that can be slid onto the mold support shells from the end facing the stretching rod can be driven by means of a motion drive of the stretching rod. The motion drive of the stretching rod thus universally fulfils a multiple function.

An electric linear motor is particularly suitably provided for moving the at least one locking sleeve into and opposite to the direction into which it is slid on. This linear motor can have relatively small dimensions as only small masses have to be moved quickly and the mechanical interaction between the conical surfaces can be generated without any excessive expenditure of force. The electric linear motor furthermore permits an exactly reproducible positioning of the locking sleeve that can be monitored.

Another suitable idea is to design and adjust the conical outer surface areas of the mold support shells and the locking sleeves such that the locking sleeves can be inserted one into the other like a telescope when they are drawn off to save assembly space above all in the direction of motion. Optionally, the mold support shells comprise stepped conical outer surface areas so that the locking sleeves can have clearly differing diameters permitting telescoping.

In a blow molding machine with a blow rotor which carries several blow molds, the respective mold parting plane can be suitably oriented radially with respect to the blow rotor axis. To be able to better utilize the available assembly space in the blow rotor or in its peripheral region, it can be alternatively suitable to incline the mold parting plane at an angle with respect to a radial orientation, either into or opposite to the blow rotor's sense of rotation.

Suitably, the mold support shells are arranged at a scissor-like flying mounting with a bearing for opening and closing the mold, so that the at least one locking sleeve can be slid on to a sufficient extent as required. As the at least one locking sleeve takes on a mold support function and withstands the forces from the blow molding process, the mounting and the bearing are relieved from these forces, so that they can be designed relatively simply and in a space-saving manner. Suitably, the mounting with the bearing is located at the rear end of the mold support shells, seen in the direction in which the locking sleeve is slid on. In this manner, a collision between the slid-on locking sleeve and the mounting are avoided. If, in contrast, locking sleeves are slid on from the opposite ends of the mold support shells, the mounting can be arranged approximately in the central region of the mold support shells, so that it is situated in-between when the locking sleeves are slid on.

In a suitable embodiment, a mold support shell, preferably a stationary mold support shell, is held at the mounting in a floating manner. The bearing for opening and closing the mold is functionally connected to a closing motion drive, preferably a cam-controlled, a hydraulic, a pneumatic or a motive drive, such that the mold parts can be first closed without mutual contact down to an intermediate distance, and are only contacted with locking pressure either by a compensation element and/or by sliding on the locking sleeve. For this, the restricted degree of freedom of the floatingly held mold support shell can be utilized. The intermediate distance can be, for example, between only 0.1 mm to 0.3 mm to prevent premature wear by the mold parts, and possibly the mold support shells, striking against each other. This clearance can then be hydraulically or pneumatically closed by the compensation element, and/or by the slid-on locking sleeve, but in any case in a manner gentle for the mold parts. As an alternative, the movement of the mold support shells can be coupled with the movement of the locking sleeve, e.g. such that the traversing locking sleeve brings the mold support shells together.

An important idea with a suitable embodiment is that the at least one slid-on locking sleeve simultaneously produces the mold support function and the locking function of the blow mold, i.e. a structurally complex mold support that needs assembly space can be omitted.

Furthermore, it can be suitable for each mold support shell to be joined with the mold part, preferably integrally formed with it. Here, the temperature control of the mold parts can be accomplished, for example, via a medium supply at the mold support shell and/or the mold part. This saves further assembly space and permits a simple manufacture of the mold support shells with the mold parts.

In a discontinuously operated blow molding machine, the at least one locking sleeve can also be used in a linear arrangement.

BRIEF DESCRIPTION OF THE DRAWINGS

With reference to the drawings, embodiments of the subject matter of the disclosure are illustrated. In the drawings.

DETAILED DESCRIPTION OF THE PREFERRED EMBODIMENT

Figure 1:
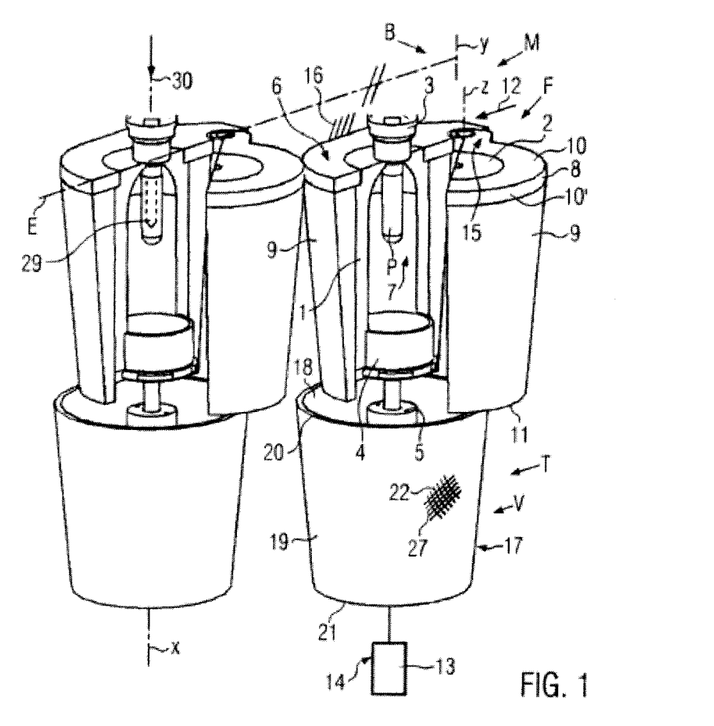
FIG. 1 shows a perspective schematic representation of main components of two blow molds for example arranged at a blow rotor of a blow molding machine in an opened state.

FIG. 1 shows opened blow molds F provided at adjacent blow molding stations of a blow rotor B of a blow molding machine M. The blow rotor B can be rotationally driven about a blow rotor axis Y. The blow molds F comprise mold parting planes E which are arranged radially to the blow rotor axis Y in the shown embodiment. Each blow mold has a blow mold axis X. As an alternative, the blow molds could be used in stationary blow molding stations of a blow molding machine. Each blow mold F serves, for example, the manufacture of containers from preforms P, for example plastic bottles, by a blow molding process or a stretch-blow molding process, where an opened blow mold is charged with a preform P, closed and locked before the blow molding process runs, and is then opened to be able to remove the produced container.

In the shown embodiment, the blow mold comprises mold parts 1, 2, mainly for forming the container walls, and a mold part 4 as a bottom mold for molding the bottom. The mold parts 1, 2 are mold shells and accommodated in mold support shells 6, 8, preferably integrally formed with the latter. The mold parts 1, 2 are joined in the mold parting plane E and locked with the mold part 4 and define a mold cavity 7. Blower air is applied in the preform P via a blow nozzle means 3 which in the shown embodiment is placed from the top at the closed and locked blow mold F. In a stretch-blow molding process, a stretching rod 29 indicated in FIG. 1 in a dashed line is introduced into the mold cavity 7 by means of a stretching rod drive 30.

Each mold support shell 6, 8 has a conical outer wall area 9 which extends essentially across the complete height of the mold support shells 6, 8, i.e. between an upper end 10 and a lower end 11. The conical outer wall areas 9 could also be defined by the envelope of ribs or projections, or they do not necessarily have to cover the complete outer surface of the mold support shells. For example, at the upper end of each mold support shell 6, 8, an assembly ring 10' is provided which serves to retain the mold support shells 6, 8 at a flying mounting 15, which is in the shown embodiment only provided at the upper end 10, with a swiveling axis Z for the relative opening and closing movements of the mold support shells 6, 8.

The mounting 15 is a bearing not shown in detail for opening and closing the mold support shells 6, 8 via a motion drive 12. In the shown embodiment, the mold support shell 6 can be a stationary mold support shell which is supported at a support 16. The mold support shell 8 can be folded open about the swiveling axis Z, or it can be linearly moved away from the mold parting plane E, which is not shown. The mold support shell 6 can furthermore be floatingly retained in the mounting 15, i.e. have a certain clearance relative to the mounting 15 (and the support 16).

As an alternative, it would be conceivable to movably hold both mold support shells 6, 8 and to thus swivel them with respect to the z-axis shown in FIG. 1.

The mold part 4, i.e. the bottom mold, can be at least lifted and lowered by means of a motion drive 5, suitably in the direction of the blow mold axis X.

The blow mold in FIG. 1 furthermore comprises a locking means V with a locking sleeve 17 which can be traversed from the shown lowered position in the direction of the axis X upwards via a motion drive 13, for example an electric linear motor 14. The locking sleeve 17 is manufactured using high-strength fiber material 27, embedded in a plastic matrix 22. The high-strength fiber material 27 suitably comprises carbon fibers or equivalent high-strength fibers, such as aramid fibers or the like. The locking sleeve 17 is completely closed in the circumferential direction and has at least one upper open end 20 and one conical inner wall 18, matching the conical outer side areas 9 of the mold support shells 6, 8. A lower end 21 of the locking sleeve 17 can be open or comprise a not represented bottom which suitably has a passage for the motion drive 5 of the mold part 4. The outer circumferential wall 19 of the locking sleeve 17 can be cylindrical or, as shown, conical and can be either parallel to the conical inner wall 18 or be such that the wall thickness of the locking sleeve 17 for example increases towards the upper opening 20. The wall thickness of the locking sleeve 17 only has to be some millimeters. The cone angle of the conical outer side areas 9 and the conical inner wall 18 are at least largely coinciding. The locking sleeve 17 serves to lock the closed mold support shells 6, 8 and to generate and maintain an all-around locking pressure for the mold support shells 6, 8 and the mold parts 1, 2, by means of which the mold part 4 is locked for a blow molding process. By this, the locking sleeve 17 takes on both a locking function for the blow mold F and a mold support function T. As an alternative, the locking sleeve 17 shown with a circular cross-section could have an oval or a different cross-section, mating the correspondingly designed mold support shells 6, 8.

Figure 7:
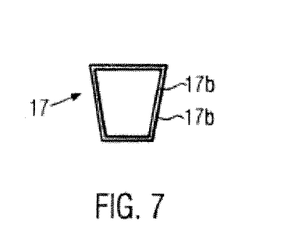
FIG. 7 shows a schematic representation of another detail variant.

In FIG. 1, one single locking sleeve 17 is associated to each blow mold F whose height, seen in the direction of the axis X, essentially corresponds to the height of the mold cavity 7 or the mold support shells 6, 8. As an alternative, instead of one single locking sleeve 17, more than one locking sleeve 17 could be provided, for example as indicated in FIG. 7, two locking sleeves 17a, 17b of different sizes which are slid on one after another and, in the slid-on state, either are close to each other or directly abut, or at least partially overlap each other. In the drawn-off state (FIG. 7), the several locking sleeves 17a, 17b can be inserted one into the other like a telescope to save assembly space in the direction of the axis X. As an alternative, more than two locking sleeves 17a, 17b could also be employed.

Figure 6:
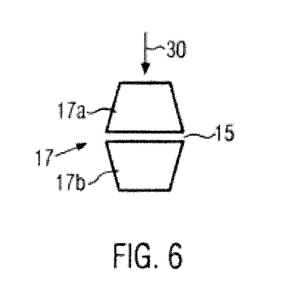
FIG. 6 shows a schematic representation of another detail variant.

FIG. 6 indicates, in connection with FIG. 1, another detail variant in which two locking sleeves 17a, 17b that are conical in opposite directions are employed instead of the locking sleeve 17 of FIG. 1 and which are slid onto the mold support shells 6, 8 from the opposite ends 10, 11 of the latter, the conical outer side areas 9 of the mold support shells 6, 8 then being correspondingly formed conically in opposite directions. If a stretching rod drive 30 is provided, it could be used in FIG. 6 to shift the upper locking sleeve 17a.

In FIG. 6, the slid-on locking sleeves 17a, 17b, for example, do not directly abut against each other, but a distance is maintained between them within which the mounting 15, which is in this case placed in a central region of the mold support shells 6, 8, can be arranged. Optionally, in FIG. 6, the locking sleeves 17a, 17b comprise cutouts for the mounting 15 at their facing openings, so that the locking sleeves 17a, 17b can be slid on to a greater extent towards each other than is shown in FIG. 6.

In a non-depicted alternative, the two mold support shells 6, 8 of FIG. 1 could also be symmetrically folded open and closed in the mounting 15 like scissors.

Figure 2:
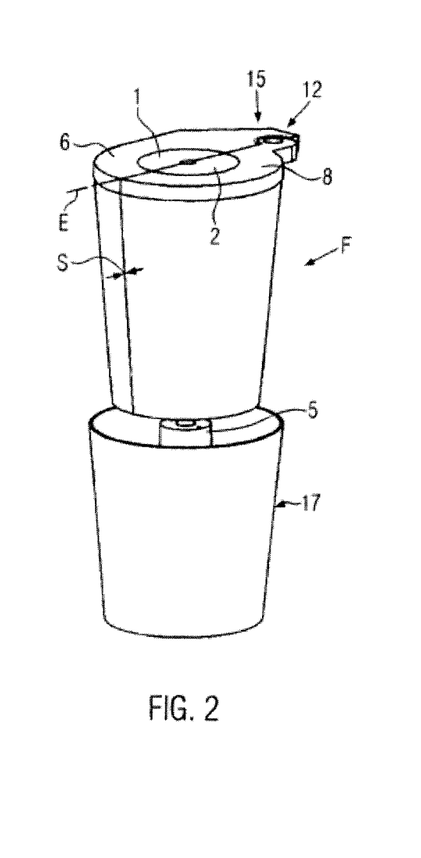
FIG. 2 shows a perspective representation of main components of a blow mold in a closed, not locked state.

In FIG. 2, the mold support shells 6, 8 are shown in a closed position which is adjusted, for example, at the mounting 15 via the bearing for opening and closing the blow mold and the motion drive 12, such that a clearance S of, for example, 0.1 mm to 0.3 mm between the mold support shells 6, 8 and/or the mold parts 1, 2 remains in the mold parting plane E, and they do not strongly strike each other. The motion drive 5 has shifted the mold part 4, which is locked with the mold parts 1, 2, upwards. The locking sleeve 17 is still in the position shown in FIG. 1 and not yet slid on. The blow mold F is thus not yet locked.

Figure 3:
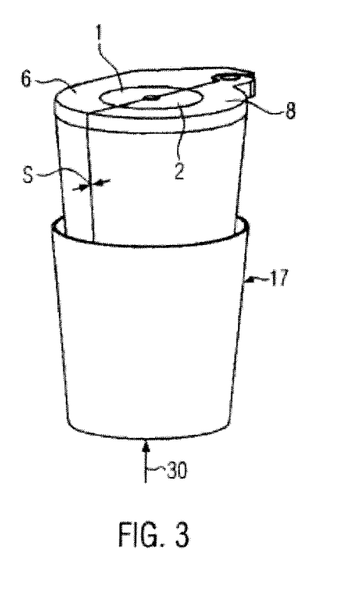
FIG. 3 shows the main components of the blow mold of FIG. 2 during the locking process.

In FIG. 3, the locking sleeve 17 is linearly shifted upwards in the direction of the arrow 23 (in the direction of the axis X), the clearance S still being present.

Figure 4:
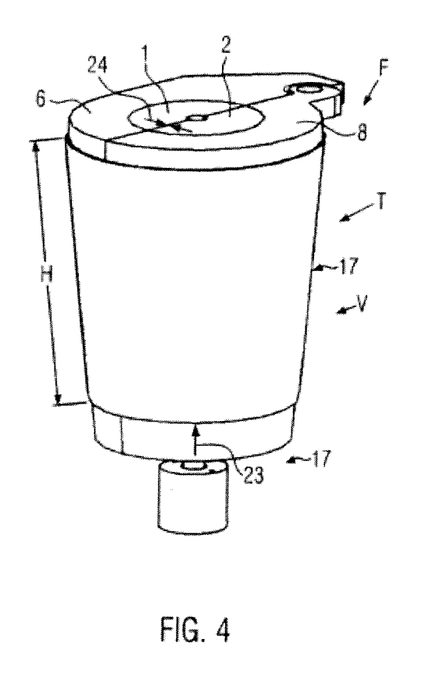
FIG. 4 shows the main components of the blow mold in a locked state.

In FIG. 4, the locking sleeve 17 has been completely shifted upwards (arrow 23), such that it acts across essentially the complete height H of the mold cavity 7 or the mold support shells 6, 8 across the complete periphery. The blow mold F is in a locked state. The mold parts 1, 2 are completely pressed against each other (arrows 24) so that the clearance S of the previous Figures is eliminated. The locking sleeve 17 in this phase acts as mold support with the mold support function T of the blow mold F. The clearance S can here be eliminated either by the sliding-on movement and the axial force acting in the direction of the arrow 23 by the conical form, and/or by a non-depicted compensation element which generates the final locking pressure pneumatically or hydraulically. The blow mold F is in FIG. 4 ready to carry out the blow molding process.

Figure 5:
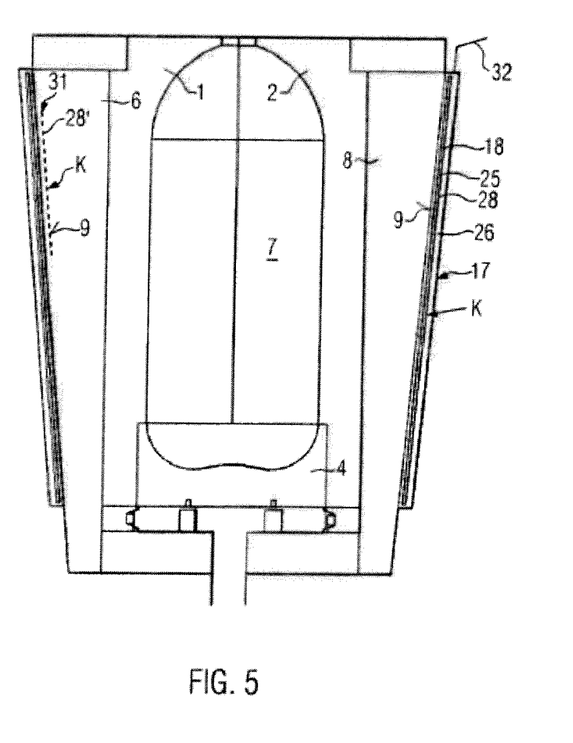
FIG. 5 shows an axial section to FIG. 4, where detail variants are indicated.

FIG. 5 shows in an axial section how the slid-on locking sleeve 17 is effective across essentially the complete height of the mold support shells 6, 8 or the mold parts 1, 2 or the mold cavity 7, respectively. FIG. 5 furthermore illustrates detail variants of the blow mold wherein e.g. at least one compensation element K is employed.

In the right half of FIG. 5, the locking sleeve 17 has double walls, in particular over the complete periphery, such that a pressure chamber 28 is formed between an inner wall 25 which defines the conical inner wall 18 in cooperation with the conical outer side area 19, and an outer wall 26. This pressure chamber 28 is, for example, lined with a bag of a flexible and/or elastic material and contains a pressure fluid (compressed air, water, oil) that can be pressurized, so that the inner wall 25 acts as membrane-like compensation element.

Reference numeral 32 symbolizes, as another detail variant, an electrical connection for heating the locking sleeve 17, for example if it is manufactured using carbon fibers whose conductivity permits to heat the locking sleeve 17 by electric resistance. As carbon fibers exhibit the phenomenon of a negative thermal expansion coefficient, the locking sleeve 17 shrinks as temperature rises to then act as compensation element K. As an alternative or in addition, the electric heating of the locking sleeve 17 can be used to control the temperature of the mold support shells 6, 8 or indirectly of the mold parts 1, 2. In the mold support shells 6, 8 (and/or in the mold parts 1, 2), channels could be furthermore provided through which a temperature-control medium flows.

In the left half of FIG. 5, another kind of compensation element K is indicated. In the conical outer side area 9 of the mold support shell 6, for example, a recess 28' open to the outside is formed which is bordered at the edge by a seal 31 which, with the locking sleeve 17 and its conical inner wall 18, defines a pressure chamber onto which a pressure medium can act for compensation. Instead of the seal 31, a bag of an elastic and/or flexible material could also be inserted, like in the right half of FIG. 5.

In the core, the common separated mold support parts are replaced by one or several locking sleeves which are manufactured using high-strength fiber material, in particular carbon fibers. The locking sleeve, having a light weight and small dimensions, is characterized by extremely high strength and permits quick traversing movements of small moved masses. If a compensation function is required, the locking sleeve can have a multilayer or double-wall design. The inner wall then produces the function of a membrane acted upon by pressure. In this manner, the function of a hydraulic clamping set is generated. Compared to well-known mold support and locking arrangements, the locking sleeve occupies extremely little assembly space, permitting a very compact arrangement of blow molding stations, for example on a blow molding unit. The strength of the at least one locking sleeve that can be achieved due to the high-strength fibers permits to withstand forces from the blow molding process (with a pressure of, for example, about $40 \times 10^5$ Pa), which basically permits to do without a pressure pad as a compensation element. Otherwise, the locking sleeve can also be designed to integrate a pressure pad if a compensation element is considered to be appropriate. The locking sleeve is suitably wound of continuous fibers.

The invention claimed is:

1. Blow mold for manufacturing blow molded or stretch-blow molded containers from preforms in a blow molding machine comprising: at least two mold parts defining a mold cavity when the blow mold is closed, a plurality of mold support shells containing the mold parts, a mold support at least for supporting the mold support shells, motion drives for opening and closing the blow mold, a locking means adjustable at least in the direction of the mold cavity axis relative to the mold support shells for locking the closed blow mold and for supporting the mold parts against forces from the blow molding process, the locking means comprising at least one locking sleeve manufactured using high-strength fiber material with a conical inner wall which can be slid with the inner wall onto conical outer surface areas of the mold support shells and supports the mold parts across essentially the complete height of the mold cavity of the blow mold.

2. The blow mold according to claim 1, wherein the locking sleeve is manufactured under the influence of pressure and temperature using carbon fibers as a high-strength fiber material and a plastic matrix embedding the high-strength fiber material.

3. The blow mold according to claim 1, wherein more than one locking sleeve can be slid from one end or from the opposite ends of the mold support shells until the locking sleeves nearly contact each other or abut against each other or partially overlap each other.

4. The blow mold according to claim 1, wherein the locking sleeve is designed with a double wall around its complete periphery, where one wall forms a compensation element and/or a temperature control element for the blow mold.

5. The blow mold according to claim 4, and wherein characterized in that a pressure chamber that can be filled with a compensation and/or temperature control medium or that can be acted upon from outside with said medium, is provided between the walls of the locking sleeve.

6. The blow mold according to claim 1, and wherein a pressure pad is either provided in at least one outside depression of at least one mold support shell in the form of a bag filled with a compensation medium, or is limited by a seal lying against the inner wall of the slid-on locking sleeve and can be acted upon from outside by a compensation medium.

7. The blow mold according to claim 2, wherein the locking sleeve manufactured using carbon fibers can be electrically heated and forms one of a mold temperature control element or, due to a negative thermal expansion coefficient, a compensation element of the locked blow mold or forms a combination thereof.

8. The blow mold according to claim 1, and wherein a stretching rod that can be linearly moved into and out of the mold cavity is functionally associated to the blow mold, and that by means of a motion drive of the stretching rod, the at least one locking sleeve slid on from the end of the support shells facing the stretching rod can be driven.

9. The blow mold according to claim 1, wherein the motion drive of the at least one locking sleeve comprises an electric linear motor.

10. The blow mold according to claim 3, wherein the conical outer surface areas of the mold support shells and the locking sleeves are designed and adjusted to each other such that the locking sleeves can be inserted one into the other like a telescope when they are drawn off from the mold support shells.

11. The blow mold according to claim 1, wherein a mold parting plane between the mold parts is set one of radially with respect to the blow rotor axis obliquely at an angle with respect to a radial orientation, or opposite to the blow rotor's sense of rotation.

12. The blow mold according to claim 1, wherein the mold support shells are arranged at a scissor-like flying mounting with a bearing for opening and closing the mold which can be relieved from forces of the blow molding process via the slid-on locking sleeve, and that the mounting is arranged either at the rear end of the mold support shells, seen in the direction in which the locking sleeve is slid on, or in case of locking sleeves to be slid on from opposite ends, in a central region of the mold support shells.

13. The blow mold according to claim 12, and wherein a mold support shell is floatingly held at the mounting, and that the bearing for opening and closing the mold is functionally connected with a closing motion drive, such that the mold parts can be closed without mutual abutment down to an intermediate distance and can be brought to an abutment with locking pressure only via at least one of a compensation element and the slid-on locking sleeve.

14. The blow mold according to claim 1, wherein the at least one slid-on locking sleeve simultaneously provides the mold support function and the locking function of the blow mold.

15. The blow mold according to claim 1, wherein each mold support shell is joined to the mold part.

16. The blow mold according to claim 1, and wherein the blow molding machine comprises a blow rotor with a plurality of blow molds.

17. The blow mold according to claim 2, and wherein the manufacturing is performed by winding continuous fibers.

18. The blow mold according to claim 4, wherein the one wall is the inner wall.

19. The blow molding according to claim 5, wherein the medium is one of compressed air, oil, and water.

20. The blow mold according to claim 5, and wherein the pressure chamber is provided with an inserted pressure pad of one of an elastic material, a flexible material, and a combination thereof.

21. The blow mold according to claim 13, and wherein the closing motion drive is one of a cam-controlled motion drive, a hydraulic motion drive, a pneumatic motion drive and a motive motion drive.

22. The blow mold according to claim 15, wherein each mold support shell is integrally formed to the mold part.

23. The blow mold according to claim 1, wherein the blow molding machine is a discontinuously operated blow molding machine having a linear arrangement of mold parts.

* * * * *